US011157064B2

(12) United States Patent
Pillilli et al.

(10) Patent No.: US 11,157,064 B2
(45) Date of Patent: Oct. 26, 2021

(54) TECHNIQUES TO DYNAMICALLY ENABLE AND DISABLE ACCELERATOR DEVICES IN COMPUTE ENVIRONMENTS

(71) Applicant: INTEL CORPORATION, Santa Clara, CA (US)

(72) Inventors: Bharat S. Pillilli, El Dorado Hills, CA (US); Eswaramoorthi Nallusamy, Cedar Park, TX (US); Ramamurthy Krithivas, Chandler, AZ (US); Vivek Garg, Folsom, CA (US); Venkatesh Ramamurthy, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 879 days.

(21) Appl. No.: 15/719,276

(22) Filed: Sep. 28, 2017

(65) Prior Publication Data
US 2019/0094946 A1 Mar. 28, 2019

(51) Int. Cl.
*G06F 1/3287* (2019.01)
*G06F 1/28* (2006.01)
*G06F 1/26* (2006.01)

(52) U.S. Cl.
CPC .............. *G06F 1/3287* (2013.01); *G06F 1/26* (2013.01); *G06F 1/28* (2013.01)

(58) Field of Classification Search
None
See application file for complete search history.

(56) References Cited

U.S. PATENT DOCUMENTS

| 5,831,849 | A | 11/1998 | Matsui | |
| 6,772,241 | B1* | 8/2004 | George | G06F 13/24 |
| | | | | 710/36 |
| 10,796,002 | B1* | 10/2020 | Raskin | G06F 21/575 |
| 2004/0068656 | A1* | 4/2004 | Lu | G06F 21/34 |
| | | | | 713/172 |
| 2006/0230191 | A1* | 10/2006 | Chang | G06F 13/4081 |
| | | | | 710/15 |
| 2011/0057936 | A1 | 3/2011 | Gotwalt et al. | |
| 2012/0032528 | A1 | 2/2012 | Toyama et al. | |
| 2013/0151877 | A1* | 6/2013 | Kadri | G06F 1/3296 |
| | | | | 713/320 |

(Continued)

FOREIGN PATENT DOCUMENTS

JP    S57168367 A    10/1982

OTHER PUBLICATIONS

European Search Report and Written Opinion for the European Patent Application No. EP18190099, dated Feb. 26, 2019, 4 pages.

*Primary Examiner* — Paul Yen
(74) *Attorney, Agent, or Firm* — Kacvinsky Daisak Bluni PLLC

(57) ABSTRACT

Various embodiments are generally directed to an apparatus, method and other techniques to send a power operation initiation indication to the accelerator device via the subset of the plurality of interconnects, the power operation initiation indication to indicate a power operation to be performed on one or more infrastructure devices, receive a response the accelerator device, the response to indicate to the processor that the accelerator is ready for the power operation, and ucause the power operation to be performed on the accelerator device, the power operation to enable or disable power for the one or more of the infrastructure devices.

25 Claims, 9 Drawing Sheets

(56) References Cited

U.S. PATENT DOCUMENTS

2013/0179710 A1    7/2013  Chang et al.
2015/0245291 A1*   8/2015  Lee .................. H04W 52/0229
                                                            370/311

* cited by examiner

500

SEND A POWER OPERATION INITIATION INDICATION TO THE ACCELERATOR DEVICE VIA THE SUBSET OF THE PLURALITY OF INTERCONNECTS, THE POWER OPERATION INITIATION INDICATION TO INDICATE A POWER OPERATION TO BE PERFORMED ON ONE OR MORE INFRASTRUCTURE DEVICES
505

RECEIVE A RESPONSE FROM THE ACCELERATOR DEVICE, THE RESPONSE TO INDICATE TO THE PROCESSOR THAT THE ACCELERATOR IS READY FOR THE POWER OPERATION
510

CAUSE THE POWER OPERATION TO BE PERFORMED ON THE ACCELERATOR DEVICE, THE POWER OPERATION TO ENABLE OR DISABLE POWER FOR THE ONE OR MORE OF THE INFRASTRUCTURE DEVICES
515

*FIG. 5*

TECHNIQUES TO DYNAMICALLY ENABLE AND DISABLE ACCELERATOR DEVICES IN COMPUTE ENVIRONMENTS

TECHNICAL FIELD

Embodiments described herein generally include techniques to dynamically enable and disable accelerator devices in compute environments.

BACKGROUND

As markets progress towards machine learning, artificial intelligence, perceptual computing, etc., processing products become more specialized and are tailored to these market segments. One of the current silicon solutions to enable promote this trend is the integration of accelerators into a traditional processor die to create Multi-Chip Package (MCP) solutions. Usage of these accelerators are workload dependent, and there have been proven real-time use cases where the accelerators are in an idle state and consume unnecessary power from the overall platform budget.

BRIEF DESCRIPTION OF THE DRAWINGS

FIG. 5 illustrates an example of a third logic flow.

DETAILED DESCRIPTION

Figure 1A:
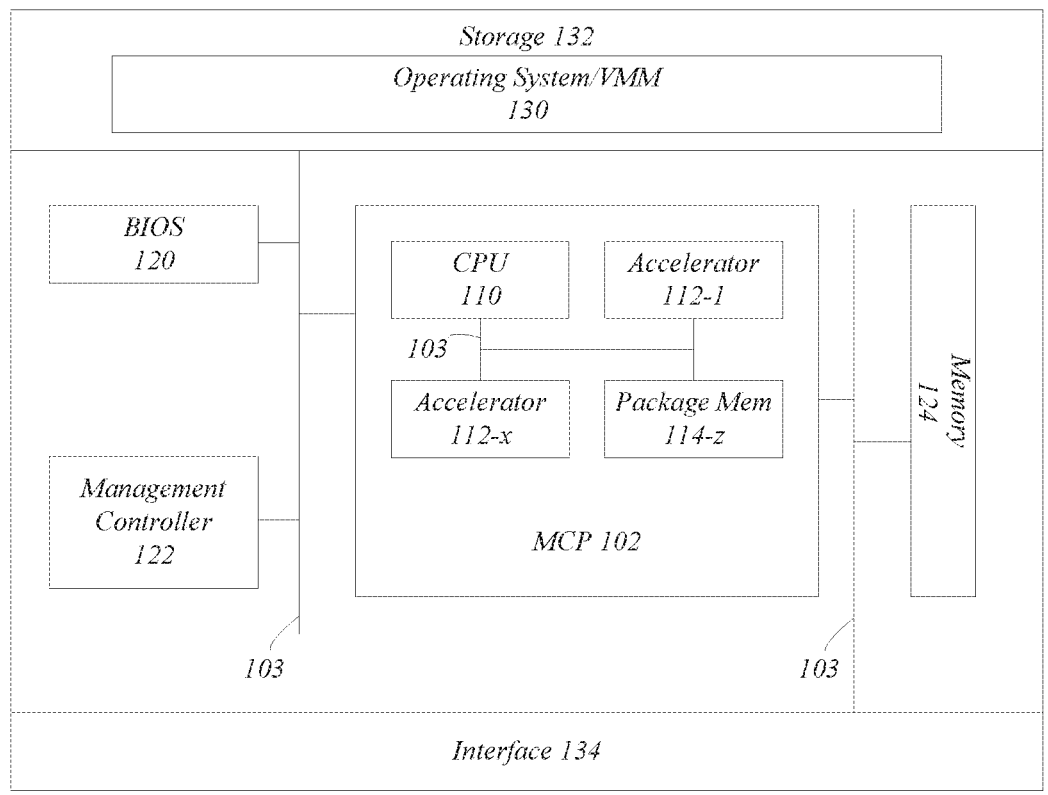
FIG. 1A illustrates a first example of a node.

As previously discussed usage of these accelerator devices are workload dependent, and there have been proven real-time use cases where the accelerators are in an idle state and consume unnecessary power from the overall platform budget. Discussed herein may be related to dynamically enabling and disabling power for accelerator devices and/or one or more infrastructure devices of the accelerator devices.

The goal of shifting power from an inactive component of a CPU to an active one has gotten a lot of attention recently. Prior solutions include enabling power balancing between CPU cores and sometimes across CPU sockets through tailored power management algorithms using telemetry information from thermal sensors, performance monitors, etc. These solutions are typically hardware autonomous with some control to an operating system (OS) or OS driven. While some of these dynamic power management solutions can be extended to accelerator devices, it requires tailoring of an accelerator die to have these advance power management features and does not eliminate the idle power consumption. In addition to the power issue, to achieve reconfiguration of the MCP (disabling the accelerator as a whole due to workload or change accelerator internal configuration), the platform including the MCP would have to recycle the through warm reset and sometimes cold reset, which is not an acceptable solution from a server or processing node where customers want 99.99% up these platforms).

Thus, embodiments are directed to dynamically controlling the accelerator devices based on workload resource requirements, which may be provided and controlled by a scheduler device. For example, embodiments include the scheduler reading workload metadata that contains workload resource requirements based on workloads for processing by a data center. The workload resource requirements may specify which processing and memory requirements are needed to process the workloads, and the scheduler may determine accelerator devices, resources, and circuitry to enable and/or disable based on workload resource requirements. Moreover, the scheduler may determine which nodes include the accelerator devices, resources, and circuitry are available and to perform power operations, e.g., enabling and disabling power for accelerator devices. In some instances, the scheduler may determine which nodes to perform the power operations based on load balancing and/or on a service level agreement (SLA) that is associated with a workload.

In one example, the scheduler may communicate with a node to cause performance of a power operation. More specifically, the scheduler directs a management controller and an operating system of the node to perform a power operation for one or more accelerator device(s). The management controller utilizing an operating system or may perform one or more operations in preparation to perform the power operation. For example, when disabling accelerator devices, the operating system may offload processes and workloads from the accelerator devices to be disabled. Similarly, in preparation of enabling accelerator devices, the operating systems determine workloads and processes to execute on the accelerator devices once the accelerator devices are enabled.

Further, either the operating system or a basic input/output system (BIOS) performs a hot-plug flow and the BIOS determines the CPU and the accelerator device to perform the power operation. The BIOS may issue a power operation indication to the CPU associated with the accelerator device. Embodiments include the CPU and accelerator device performing the power operation, as will be discussed in more detail. The CPU may also notify the BIOS of completion of the power operation.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an example embodiment of a node 101 in which aspects of the present disclosure may be employed to process data and perform dynamic enablement and disablement of accelerator devices. The node 101 is a computing device, such as a personal computer, desktop computer, tablet computer, netbook computer, notebook computer, laptop computer, a mobile computing device, a server, server farm, blade server, a rack-based server, a rack-based processing board, and so forth. In embodiments, the node 101 includes devices, circuitry, memory, storage, and components to process data and information. In the illustrated example, the node 101 includes a multi-chip package (MCP) 102 having a central processing unit (CPU) 110, one or more accelerator devices 112-x, where x may be any positive integers, and package memory 114-z, where z may be any positive integer. The package memory 114 may be volatile memory, such as cache that can be used by the other components of the MCP 102 to process information and data. The MCP 102 may include additional circuitry and registers. Moreover, the MCP 102 may include more than one CPU 110, and each of the CPUs 110 may include a number of processing cores to process data. The node 101 further includes a basic input/output system (BIOS) 120, a management controller 122, memory 124, storage 132 having an operating system 130, and interface(s) 134.

In embodiments, the CPU 110 is implemented using any processor or logic device and may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The CPU 110 may be connected to and communicate with the other elements of the MCP 102 via interconnects 103, as will be discussed in more detail below with respect to FIG. 1B. The CPU 110 may also include cache, registers, and other circuitry. Embodiments are not limited in this manner.

In embodiments, the MCP 102 includes one or more accelerator device(s) 112-x, where x may be any positive integer. A accelerator device 112 may be hardware (processor) accelerator device designed to provide hardwired logic to accelerate specific processing tasks, such as graphics, mathematical operations, cryptographic operations, media processing, image processing, and so forth. Examples of an accelerator device 112 includes a graphics processing unit (GPU), a cryptographic unit, a physics processing unit (PPU), a fixed function unit (FFU), and the like. Embodiments are not limited in this manner.

In embodiments, the node 101 includes a memory 124 coupled with the MCP 102 via one or more interconnects. The memory 124 may be one or more of volatile memory including random access memory (RAM) dynamic RAM (DRAM), static RAM (SRAM), double data rate synchronous dynamic RAM (DDR SDRAM), SDRAM, DDR1 SDRAM, DDR2 SDRAM, SSD3 SDRAM, single data rate SDRAM (SDR SDRAM), DDR3, DDR4, and so forth. Embodiments are not limited in this manner, and other memory types may be contemplated and be consistent with embodiments discussed herein. For example, the memory 124 may be a three-dimensional crosspoint memory device, or other byte addressable write-in-place nonvolatile memory devices. In embodiments, the memory devices may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory based device, a magnetic tunneling junction (MTJ) based device, a DW (Domain Wall) and SOT (Spin-Orbit Transfer) based device, a thyristor-based memory device, or a combination of any of the above, or other memory.

In embodiments, the node 101 includes storage 132, which can be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 132 may include technology to increase the storage performance enhanced protection for valuable digital media when multiple hard drives are included, for example. Further examples of storage 132 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

The storage 132 may include an operating system 130 or system software that manages the node's 101 hardware and software resources and to provide common services for computer programs, software applications, and hardware components. The operating system 130 may be a Windows® based operating system, an Apple® based on operating system, a Unix® based operating system, and so forth. In some embodiments, the operating system 130 may not be stored in storage 132, but may be loaded and run from the memory 124. In another example, the operating system 130 may load from a network and run from memory 124. In some embodiments, the node 101 may not include storage 132 and embodiments are not limited in this manner.

The operating system 130 also performs operations to enable performance of the power operation for the accelerator device(s) 112. For example, the operating system 130 may receive a notification and data from a scheduler notifying the operating system 130 of the power operation. The operating system 130 may perform one or more operations in preparation of the power operation. For example, when disabling an accelerator device 112 the operating system 130 may offload processes and workloads from the accelerator devices 112 to be disabled. Similarly, in preparation of enabling an accelerator device 112 the operating system 130 determines which workloads and processes to execute on the accelerator device 112 once the accelerator devices are enabled.

In some instances, the operating system 130 performs a hot-plug flow in preparation of performing a power operation. The operating system 130 may cause a hot-plug flow if the input/output (I/O) link between the CPU 110 and an accelerator device 112 is managed by the operating system 130, e.g., the operating system can control the I/O link. If the power operation enables power to an accelerator device 112, the hot-plug flow includes initializing any interconnects or buses, reserving memory, configuring/setting registers, and loading any additional software (drivers) to support the accelerator device 112, for example. If the power operation disables power to an accelerator device 112, the hot-plug flow includes configuring registers, enabling memory to be released, and so forth. The operating system 130 also indicates to the BIOS 120 to enable or disable the accelerator devices 112. In one example, the operating system 130 may utilize Advanced Configuration and Power Interface (ACPI) message or interrupt to notify the BIOS 120 to cause the power operation.

In embodiments, the node 101 includes one or more interface(s) 134 to communicate data and information with other nodes and compute systems, for example. An interface 134 may be capable of communicating via a fabric network or an Ethernet network, optically and/or electrically. The node 101 may receive data from one or more of a data center, a management server, a scheduler, and so forth. The received data and information may cause a power operation to be performed on the node 101. Other examples of an interface 134 include a Universal Serial Bus (USB) ports/adapters, IEEE 1394 Firewire ports/adapters, and so forth. Examples of other interfaces 134 include parallel interfaces, serial interfaces, and bus interfaces. Embodiments are not limited in this manner.

In embodiments, the node 101 also includes a BIOS 120 which is firmware stored in non-volatile memory. The BIOS 120 controls and performs hardware initialization during the booting process of the node 101, and provides runtime services for operating systems and programs. The BIOS 120 may be an Extensible Firmware Interface (EFI) device, a Unified EFI (UEFI) device, a platform-independent Open Firmware Institute of Electrical and Electronics Engineers 1275 (IEEE-1275), and so forth.

In embodiments, the BIOS 120 performs one or more operations to enable the power operation. For example, if the I/O link between the CPU 110 and the accelerator devices 112 is BIOS 120 managed or not visible to the operating system 130, e.g., the operating system 130 cannot control the I/O link, the BIOS 120 receives control of the power operation processing flow from the operating system 130 and the BIOS performs the hot-plug flow for the accelerator device(s) 112.

The BIOS 120 may determine which CPU 110, accelerator devices 112, and infrastructure devices on which to perform the power operation by reading one or more registers, such as the CAPID register(s). Moreover, the BIOS 120 may issue a power operation indication to the CPU 110 associated with the accelerator device 112 to perform the operation. In embodiments, the power operation indication may be a mailbox command, such as a BIOS2Pcode mailbox command, to cause the power operation. Embodiments are not limited in this manner.

In embodiments, the BIOS 120 may perform one or more provisioning operations during boot time to support dynamic enablement/disablement of the accelerator device 112. For example, the BIOS 120 and CPU 110 may treat each of the accelerator devices 112 like a Peripheral Component Interconnect (PCI) host bridge and perform following provisioning operations including, but not limited, to padding of PCI bus ranges, padding of memory mapped I/O low (MMIOL) range and memory mapped I/O high (MMIOH) range, pre-allocating credits/buffers in the CPU 110 for the accelerator device 112, disabling the I/O link 151 connecting to the accelerator device 112, generating a system management interrupt (SMI) when accelerator device is enabled, and performing master aborting to allow access to the padded PCI Bus, MMIOL and MMIOH ranges without affecting system operations. Embodiments are not limited in this manner.

Figure 1B:
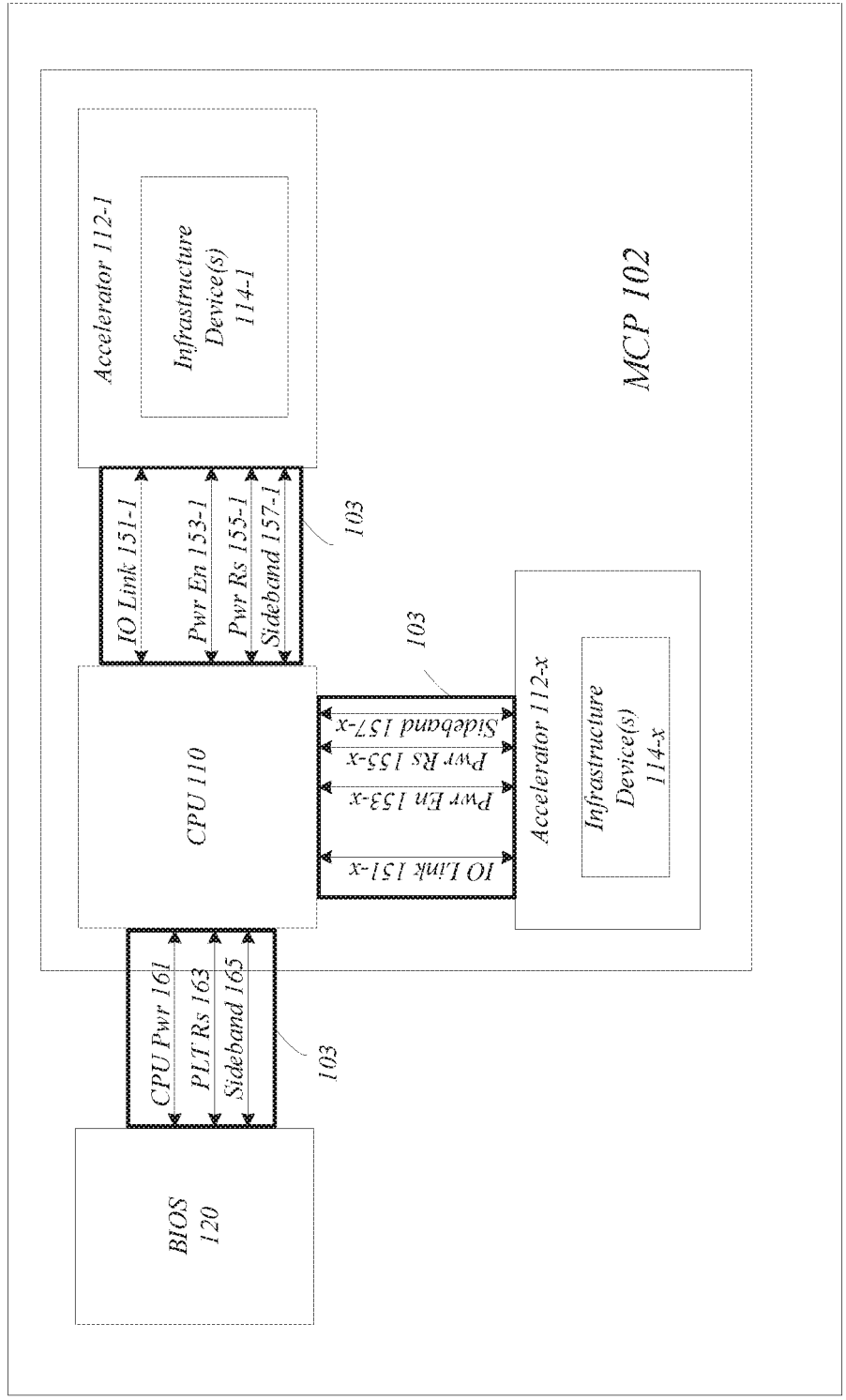
FIG. 1B illustrates a second example of a node.

FIG. 1B illustrates a second example of node 101 detailing interconnects 103 between the components including the BIOS 102, the CPU 110, and one or more accelerator devices 112-x having infrastructure device(s) 114-x. As will be discussed in more detail below, the components may communicate data with each other via one or more of the interconnects 103 to perform power operations to enable and disable accelerator devices 112 and/or the one or more infrastructure devices 114.

The one or more infrastructure devices 114 include one or more of integrated processors (IPs), field-programmable gate array(s) (FPGA(s)), one or more cores, calculation units, registers, application-specific integrated circuits (ASICs), and other processing circuitry. In embodiments, the power operation may dynamically enable and/or disable accelerator devices 112 and/or infrastructure devices 114. For example, one or more of the multiple accelerator devices 112 may be enabled, while one or more other multiple accelerator devices 112 may be disabled. Similarly, each of the accelerator devices 112 may include one or more infrastructure devices 114 that can be individually and dynamically controlled. One or more the infrastructure devices 114 of a particular accelerator device 112 may be enabled, while one or more other infrastructure devices 114 of the accelerator device 112 may be disabled.

As previously mentioned, the BIOS 120 initiates the power operation for the accelerator devices 112 based on data received from the operating system 130 and/or the management controller 122. In embodiments, the BIOS 120 may receive control from the operating system 130 to perform the power operation, which may be triggered by an ACPI interrupt or message. The BIOS 120 determines the power operation to perform, e.g., which accelerators 112 and/or infrastructure devices 114 to enable/disable, based on a reading of one or more registers (CAPID registers). The BIOS 120 may issue a power operation indication to the CPU 110 associated with the accelerator. In embodiments, the power operation indication may be a mailbox command, such as a BIOS2Pcode mailbox command, sent to the CPU 110 via a sideband link 165 to cause the power operation. The power operation indication may initiate the power operation on the CPU 110.

The CPU 110 may determine the power operation to perform, e.g. enable/disable one or more accelerator devices 112 and/or infrastructure devices 114 based on the power operation indication. In one example, the power operation indication may indicate enabling power for accelerator device(s) 112 and infrastructure device(s) 114. In another example, the power operation indication may indicate disabling power for accelerator device(s) 112 and infrastructure device(s) 114, as will be discussed in more detail below. In some embodiments, the CPU 110 also determines which of one or more accelerator devices 112-x and/or infrastructure(s) 114-x on which to perform the power operation.

The CPU 110 may send a power operation initiation indication to the accelerator device 112, via one or more of a plurality of interconnects 103. Moreover, the power operation initiation indication indicates a power operation to the accelerator device 112 including infrastructure devices 114. In one example, when enabling power for an accelerator device 112, the CPU 110 asserts a power enable pin 153, such as a CD_PWRGOOD pin, to send the power operation initiation indication to the accelerator device 112. Note that embodiments may include opposite logic, e.g., de-assertion of a pin to indicate enabling of power, and be consistent with embodiments discussed herein.

The accelerator device 112 may receive the power initiation indication or detect the assertion of the power enable pin 153. In embodiments, the accelerator device 112 sends, and the CPU 110 receives a response to the power initiation indication to indicate that the accelerator device 112 is ready for configuration and the power operation. The response may be sideband ready message including an infrastructure ready parameter, such as CDRDY2CPU [INFRA], from the accelerator device 112 communicated via a sideband link 157. The infrastructure ready parameter indicates that the infrastructure devices 114 are ready for configuration and enablement of power.

The CPU 110 may receive the sideband ready message from the accelerator device 112 and determine the accelerator device 112 is ready for configuration and enablement of power. The CPU 110 sends a power-on configuration message to configure one or more of the infrastructure devices 114 via the sideband link 157. The power-on configuration message includes which of one or more infrastructure device 114 of the accelerator device 112 to enable power and a configuration for the infrastructure devices 114. The configuration may be specified by the BIOS 120 and provided in the power operation indication.

The accelerator device 112 receives the power-on configuration message and performs one or more configuration operations for the infrastructure devices 114, e.g., ensure registers are cleared and/or set with proper starting values, circuitry is in the proper state, and so forth. The accelerator device 112 sends and the CPU 110 receives a sideband complete message, such as CDRDY2CPU [HOST], indicating the configuration of the one or more infrastructure devices completed. The sideband complete message may be sent via the sideband link 157 between the accelerator device 112 and the CPU 110. Moreover, the CPU 110 receives the sideband complete message and causes the power operation, e.g., enablement of power in this example. In embodiments, the CPU 110 may cause the power operation by de-asserting a power reset pin 155, such as the CD_RESET_N pin. The accelerator device 112 may detect the de-assertion of the power reset pin 155, which causes power to be applied to the one or more infrastructure devices 114. The CPU 110 sends an indication to the BIOS 120 indicating completion of the power operation. In some embodiments, the BIOS 120 may poll the mailbox command to detect completion of the power operation sent via the sideband link 165.

In another example, the power operation indication may indicate disabling power for accelerator device(s) 112 and infrastructure device(s) 114. To disable power, the BIOS 120 communicates, and the CPU 110 receives a power operation indication via at least one of a plurality of interconnects 103. The power operation indication initiates the power operation for the accelerator device 112. In some embodiments, the power operation indication may be a mailbox command, such as be a BIOS2Pcode mailbox command, communicated via a sideband link 165 from the BIOS 120 to the CPU 110. The power operation indication may have been provisioned by the operating system and may be based on resource requirements provided by a data center. In this example, the power operation indication indicates disabling power for the accelerator device 112 including infrastructure devices 114.

In embodiments, the CPU 110 may receive the power operation indication and process the power operation indication. More specifically, the CPU 110 including the firmware and circuitry, such as power management firmware, determines the power operation indiction is to disable power for the accelerator device 112 and infrastructure devices 114. In some embodiments, the CPU 110 may determine which of one or more accelerator devices 112-x and/or infrastructure devices 114-x to disable power. The CPU 110 may send a power operation initiation indication to the accelerator device 112, via one or more of a plurality of interconnects. In one example, when disabling power for an accelerator device 112, the CPU 110 may send a sideband reset message, such as Sx_Warn, via a sideband link 157 to the accelerator device 112.

The accelerator device 112 may receive the power operation initiation indication and perform a number of operations including conducting an internal reset sequence to reset the infrastructure devices 114, enable any context flushing, cause debug mode quiescing, and power gate any integrated processors. The accelerator device 112 sends and the CPU 110 receives a response to indicate that the accelerator device 112 is ready for the power operation. In embodiments, the response is sideband reset acknowledgment message, such as Sx_Warn_Ack, from the accelerator device 114 communicated via a sideband link 157.

The CPU 110 may receive the sideband reset acknowledgment message from the accelerator device 112 and determine the accelerator device 112 is ready for disablement of power. The CPU 110 asserts the power reset pin 155, e.g., CD_RESET_N, which is detected by the accelerator device 112. Asserting the power reset pin causes the infrastructure devices 114 to be under reset, and phase-locked loop devices are shutdown. The CPU 110 also de-asserts the power enable pin 153, e.g., CD_PWRGOOD, causing the accelerator device's 112 fully integrated voltage regulators to shutdown and the accelerator device 112 to be in a low power level. The CPU 110 may send an indication to the BIOS 120 indicating completion of the power operation via the sideband link 165. In some embodiments, the BIOS 120 may poll the mailbox command to detect completion of the power operation via the sideband link 165.

Figure 2A:
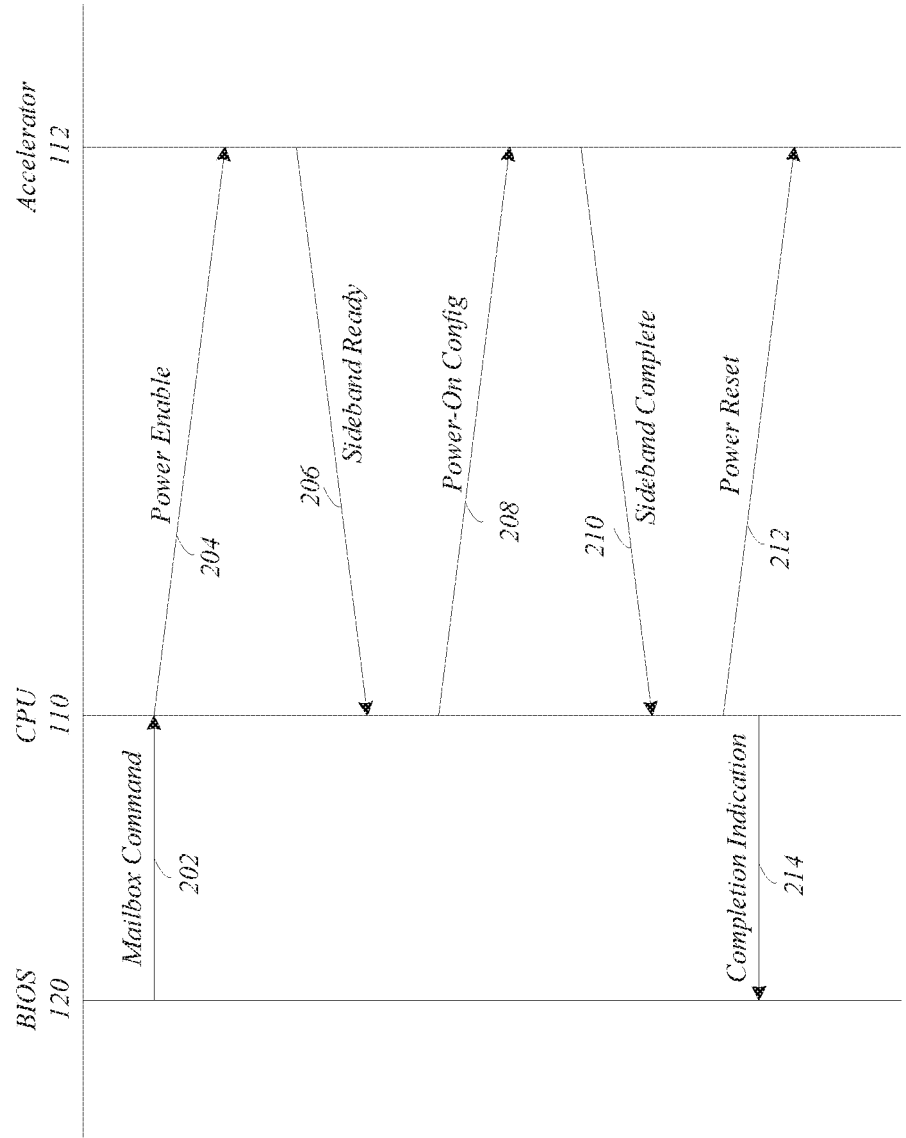
FIG. 2A illustrates an example of a processing flow.

FIG. 2A illustrates an example of a processing flow 200 that may be representative of some or all of the operations executed by one or more embodiments described herein. For example, the processing flow 200 may illustrate operations performed by a CPU 110, an accelerator device 112, and a BIOS 120. However, embodiments are not limited in this manner, and one or more other components may perform operations to enable and support the operations discussed in this processing flow 200.

At line 202, the BIOS 120 communicates, and the CPU 110 receives a power operation indication via at least one of a plurality of interconnects. The power operation indication initiates the power operation for the accelerator device. In some embodiments, the power operation indication may be a mailbox command, such as be a BIOS2Pcode mailbox command, communicated via a sideband link from the BIOS 120 to the CPU 110. The power operation indication may have been provisioned by the operating system and may be based on resource requirements provided by a data center. The power operation indication indicates enabling or disabling power for the accelerator device 112 and infrastructure devices. Enabling power for the accelerator device 112 can include causing an exiting a lower power level, such as a sleep state (Sx) as defined by ACPI, into higher power level or operating state. Disabling power for the accelerator device 112 can include causing an entering a lower power level, or a Sx, and exiting a higher power level or operating state. In the illustrated example of FIG. 2A, the power operation includes enabling power for the accelerator device 112 and the power operation indication indicates enabling power for the accelerator device 112.

In embodiments, the CPU 110 may receive the power operation indication and process the power operation indication. More specifically, the CPU 110 including firmware and circuitry, such as power management firmware, determines the power operation indiction is to enable power for the accelerator device 112, for example. In some embodiments, the CPU 110 may determine which of one or more accelerator devices 112-x power to enable power. At line 204, the CPU 110 may send a power operation initiation indication to the accelerator device 112, via one or more of a plurality of interconnects. Moreover, the power operation initiation indication to indicate a power operation to be performed on the accelerator device 112 including infrastructure devices 114. In one example, when enabling power for an accelerator, the CPU 110 asserts a power enable pin, such as a CD_PWRGOOD pin, to send the power operation initiation indication to the accelerator device 112.

The accelerator device 112 may receive the power initiation indication or detect the assertion of the power enable pin. At line 206, the accelerator device 112 sends, and the CPU 110 receives a response to indicate that the accelerator device 112 is ready for configuration and the power operation. In embodiments, the response is sideband ready message includes an infrastructure ready parameter, such as CDRDY2CPU [INFRA], from the accelerator device communicated via a sideband link between the accelerator device 112 and the CPU 110. The infrastructure ready parameter to indicate that the infrastructure devices 114 are ready for configuration and enablement of power.

The CPU 110 may receive the sideband ready message from the accelerator device 112 and determine the accelerator device 112 is ready for configuration and enablement of power. At line 208, the CPU 110 sends a power-on configuration message to configure one or more of the infrastructure devices 114. The power-on configuration message includes which of one or more infrastructure device 114 of the accelerator device 112 to enable power and a configuration for the infrastructure devices 114. The configuration may be specified by the BIOS 120 and provided in the power operation indication. In embodiments, the power-on configuration message is communicated via a sideband link between the CPU 110 and the accelerator device 112.

The accelerator device 112 receives the power-on configuration message and performs one or more configuration operations for the infrastructure devices 114, e.g., ensure registers are cleared and/or set with proper starting values, circuitry is in the proper state, and so forth. At line 210, the accelerator device 112 sends and the CPU 110 receives a sideband complete message, such as CDRDY2CPU [HOST], indicating the configuration of the one or more infrastructure devices completed. The sideband complete message may be sent via the sideband link between the accelerator device 112 and the CPU 110. At line 212, the CPU 110 receives the sideband complete message and causes the power operation, e.g., enablement of power in this example. In embodiments, the CPU 110 may cause the power operation by de-asserting a power reset pin, such as CD_RESET_N. The accelerator device 112 may detect the de-assertion of the power reset pin and power the one or more infrastructure devices 114. At line 214, the CPU 110 sends an indication to the BIOS 120 indicating completion of the power operation. In some embodiments, the BIOS 120 may poll the mailbox command to detect completion of the power operation.

Figure 2B:
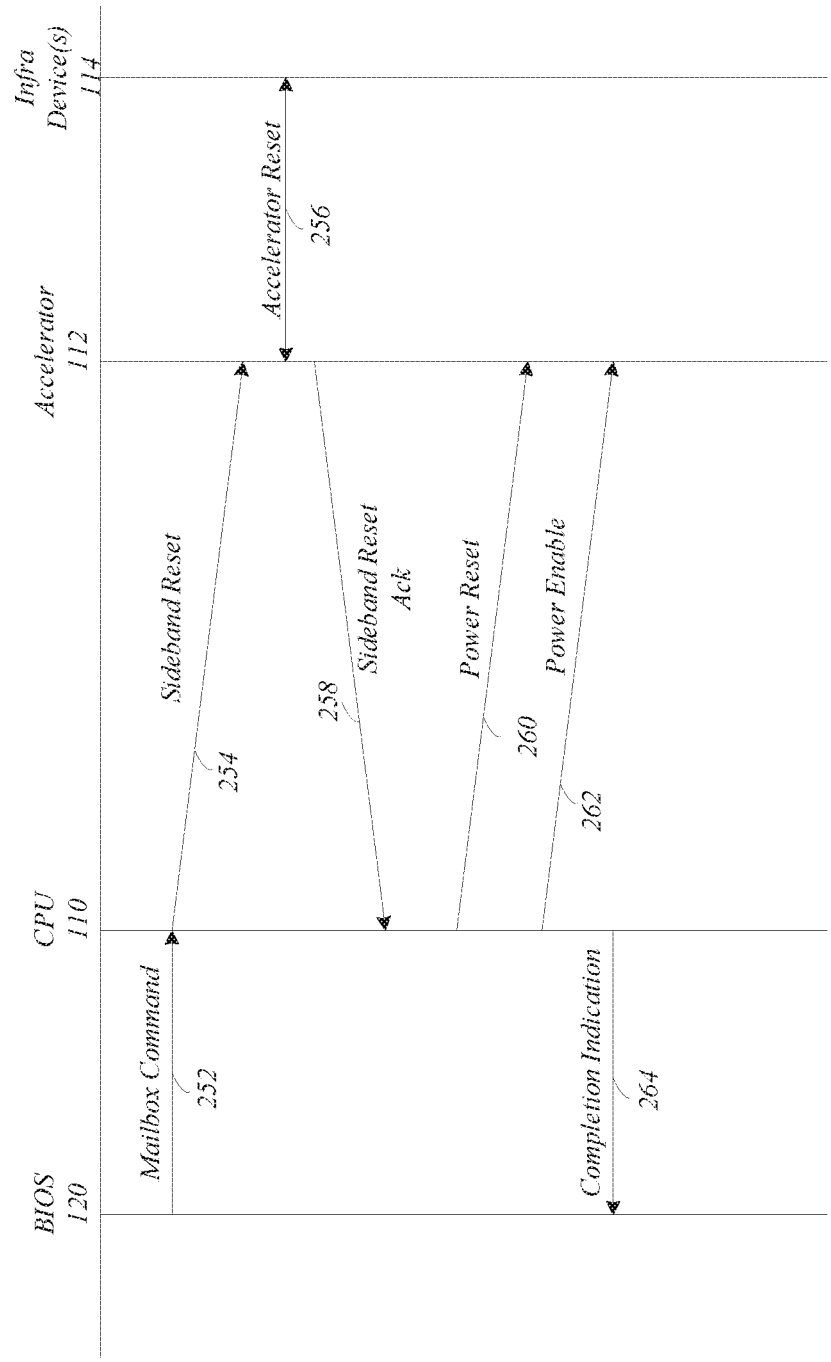
FIG. 2B illustrates an example of a second processing flow.

FIG. 2B illustrates an example of a processing flow 250 that may be representative of some or all of the operations executed by one or more embodiments described herein to disable/reduce power for an accelerator device 112 and infrastructure devices 114. For example, the processing flow 250 may illustrate operations performed by a CPU 110, an accelerator device 112, and a BIOS 120. However, embodiments are not limited in this manner, and one or more other components may perform operations to enable and support the operations discussed in this processing flow 250.

At line 252, the BIOS 120 communicates, and the CPU 110 receives a power operation indication via at least one of a plurality of interconnects. The power operation indication initiates the power operation for the accelerator device 112.

In some embodiments, the power operation indication may be a mailbox command, such as be a BIOS2Pcode mailbox command, communicated via a sideband link from the BIOS 120 to the CPU 110. The power operation indication may have been provisioned by the operating system and may be based on resource requirements provided by a data center. The power operation indication indicates of enabling or disabling power for the accelerator device 112, as previously discussed. In the illustrated example of FIG. 2B, the power operation includes disabling power for the accelerator device 112, and the power operation indication indicates disabling power for the accelerator device 112.

In embodiments, the CPU 110 may receive the power operation indication and process the power operation indication. More specifically, the CPU 110 including the firmware and circuitry, such as power management firmware, determines the power operation indication is to disable power for the accelerator device 112, for example. In some embodiments, the CPU 110 may determine which of one or more accelerator devices 112-x to disable power. At line 254, the CPU 110 may send a power operation initiation indication to the accelerator device 112, via one or more of a plurality of interconnects. In one example, when disabling power for an accelerator device 112, the CPU 110 may send a sideband reset message, such as Sx_Warn, via a sideband link to the accelerator device 112.

The accelerator device 112 may receive the power operation initiation indication and perform a number of operations including conducting an internal reset sequence to reset the infrastructure devices 114, enable any context flushing, cause debug mode quiescing, and power gate any integrated processors at line 256. At line 258, the accelerator device 112 sends, and the CPU 110 receives a response to indicate that the accelerator device 112 is ready for the power operation. In embodiments, the response is sideband reset acknowledgment message, such as Sx_Warn_Ack, from the accelerator device 114 communicated via a sideband link.

The CPU 110 may receive the sideband reset acknowledgment message from the accelerator device 112 and determine the accelerator device 112 is ready for disablement of power. At line 260, the CPU 110 asserts the power reset pin, e.g., CD_RESET_N, which is detected the accelerator device 112. Asserting the power reset pin causes the infrastructure devices 114 to be under reset, and phase-locked loop devices are shutdown. At line 262, the CPU 110 may de-assert the power enable pin, e.g., CD_PWRGOOD, causing the accelerator device's 112 fully integrated voltage regulators to shutdown and the accelerator device 112 to be at a lower power level. At line 264, the CPU 110 may send an indication to the BIOS indicating completion of the power operation. In some embodiments, the BIOS 120 may poll the mailbox command to detect completion of the power operation.

Figure 3:
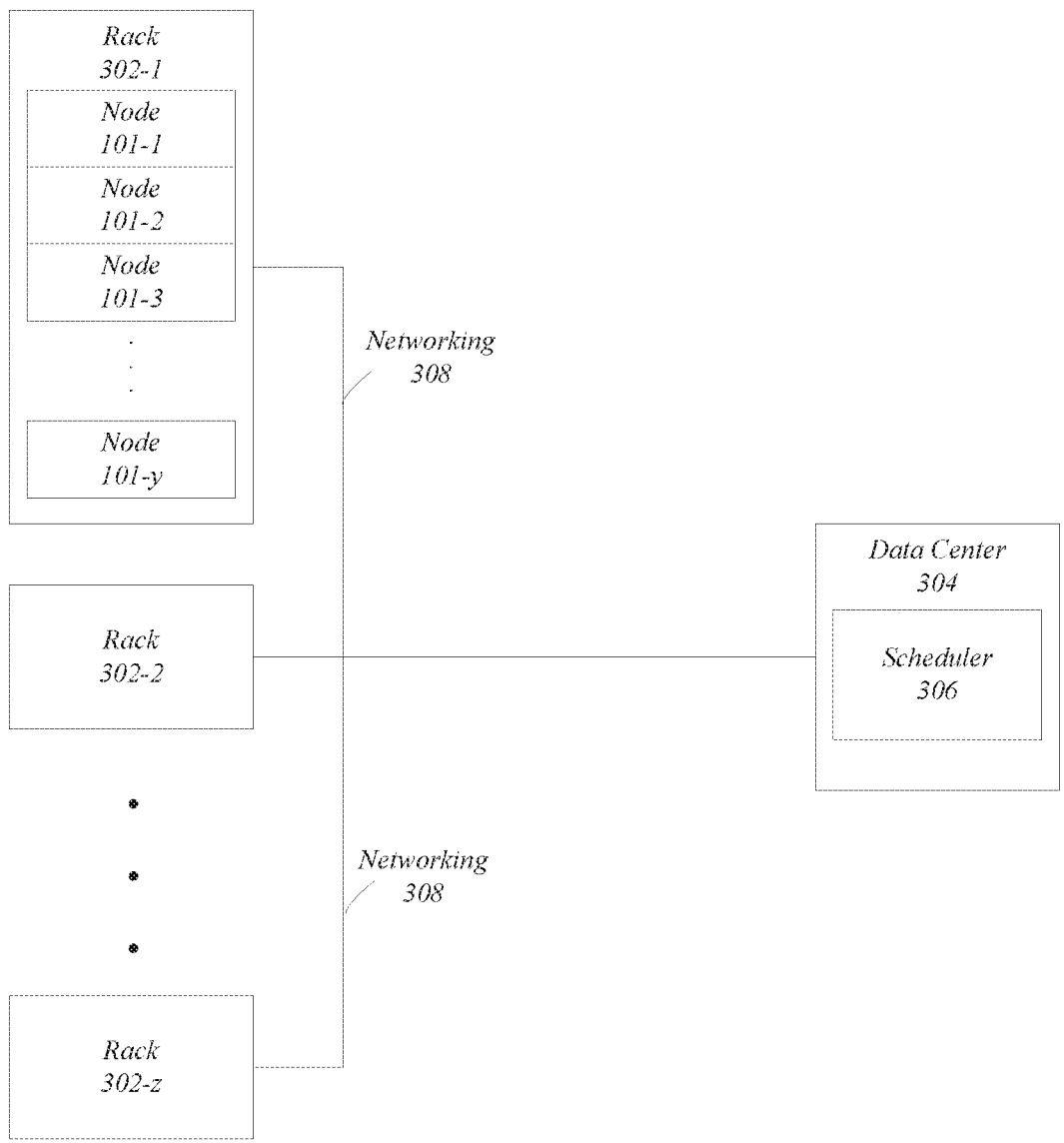
FIG. 3 illustrates an example of a system.

FIG. 3 illustrates an example of a first system 300 that may be representative of a type of computing system in/for which one or more techniques described herein may be implemented according to various embodiments. As shown in FIG. 3, the system may contain a plurality of racks 302-z, where z may be any positive integer, each of which may house computing equipment comprising a respective set of nodes 101-y, where y may be any positive integer, which may be distributed among the racks 302-z. As previously discussed, a node 101 may include resources, such as MCPs including CPUs and accelerator devices, to process data and workloads in the first system 300.

In some embodiments, the nodes 101-y may be circuit boards on which components such as MCPs having CPUs, accelerators, memory, and other components. The nodes 101-*y* may be configured to mate with power and data communication cables in each rack 302-*z* to be coupled with networking 308 to communicate with a scheduler device 306 and a data center 304. The networking 308 may utilize a fabric network architecture that supports multiple other network architectures including Ethernet and Omni-Path. For example, the nodes 101-*y* may be coupled switches and other networking equipment via optical fibers. However, other embodiments may utilize twister pair cabling (e.g., Category 5, Category 5e, Category 6, etc.). The data center 304 and scheduler 302 may, in use, pool resources of the nodes 101-*y*, such as the memory, accelerator devices, CPUs, and data storage drives to process workloads on an as needed basis.

In embodiments, the data center 304 includes a number of devices and components to monitor and control processing of workloads for the system 300. The data center 304 includes scheduler 306, which may be implemented in hardware, software, or a combination thereof, to process workload requests and dynamically allocate workloads for processing by the nodes 101. In one example, the scheduler 306 receives usage information from the various nodes 101, predicts resource usage for different types of workloads based on past resource usage, and dynamically reallocates the nodes 101 based on this information. The scheduler 306 determines which accelerator devices and infrastructure devices are required to process a workload and notifies the corresponding nodes 101 with the accelerator devices and infrastructure devices and indication of the power operation. The allocation of workloads may be based on a service level agreement (SLA) associated with the workload, workload resource requirements, and load balancing algorithms.

The scheduler 306 can determine workload resource requirements by reading workload metadata that contains the workload resource requirements. A data center component 304 or control system may generate workload metadata and send it to the scheduler 306, for example. The workload resource requirements may specify which processing and memory requirements are needed to process the workload, and the scheduler 306 may determine accelerator devices, resources, and circuitry to enable and/or disable based on requirements. Moreover, the scheduler 306 may determine which nodes 101 including the accelerator devices, resources, and circuitry are available and to perform power operations. The scheduler 306 directs a management controller of a node 101 to perform a power operation to enable or disable one or more accelerator devices and infrastructure devices based on the workload resource requirements.

Figure 4A:
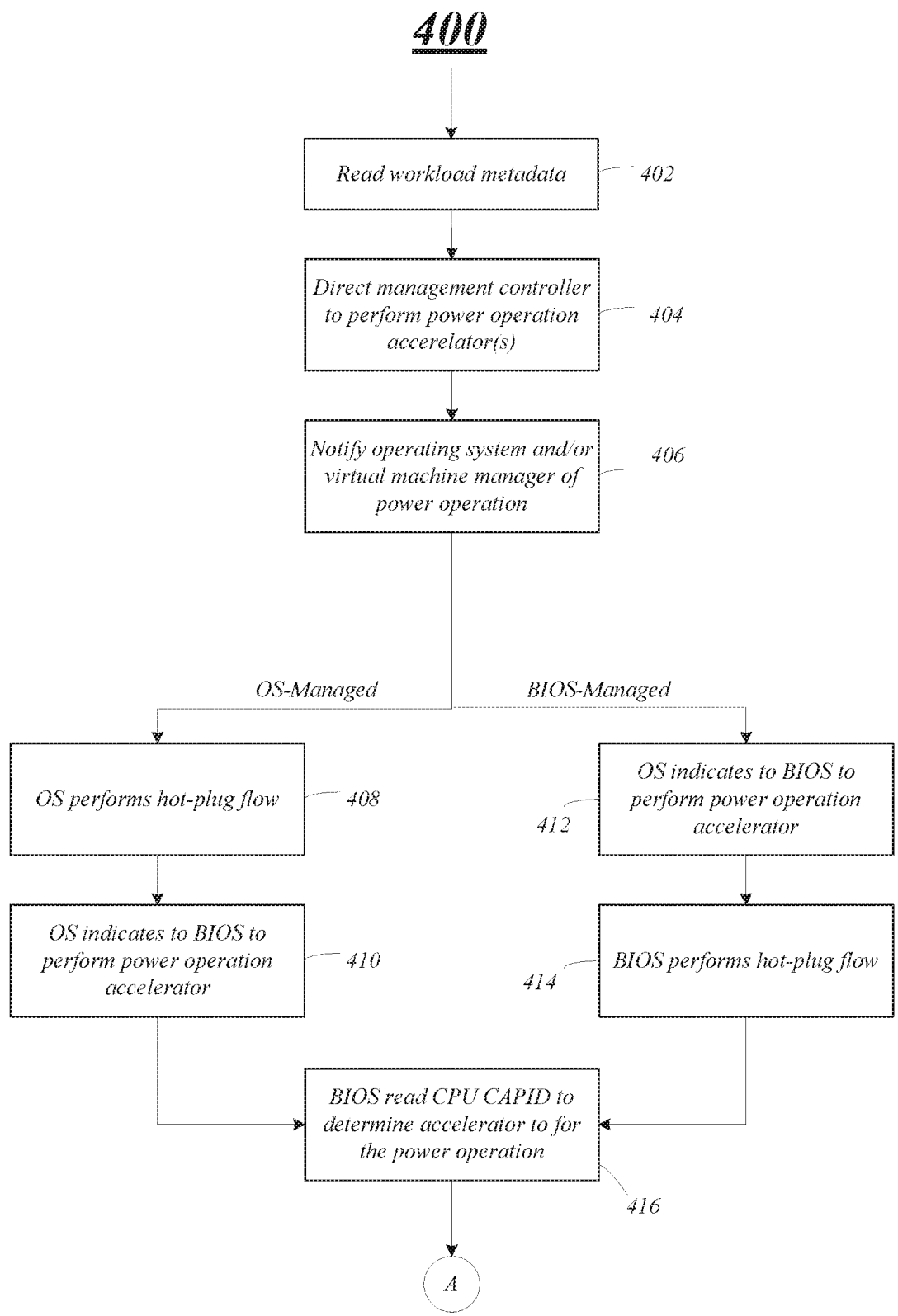
FIG. 4A illustrates an example of a third processing flow.
Figure 4B:
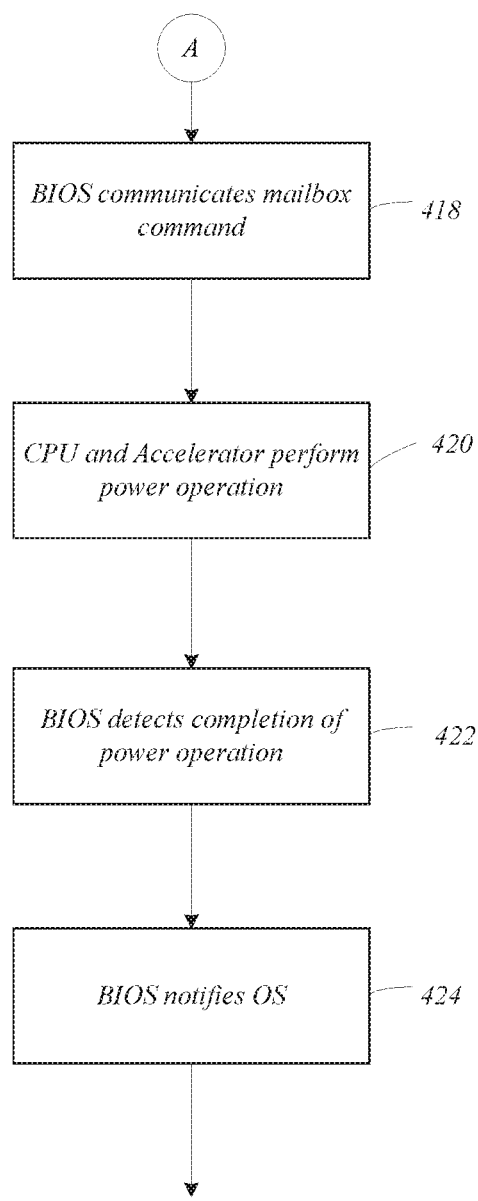
FIG. 4B illustrates further operations of the third processing flow.

FIG. 4 illustrates an example of a processing flow 400 that may be representative of some or all of the operations executed by one or more embodiments described herein. For example, the processing flow 400 may illustrate operations performed to determine power operations to perform on one or more accelerator devices and to cause the power operation to be performed.

At block 402, the processing flow 400 includes a scheduler reading workload metadata that contains workload resource requirements based on a workload. For example, a data center component or control system may send workload metadata via a network to a node for processing a workload, which may be read by a scheduler. The workload resource requirements may specify which processing and memory requirements are required to process the workload, and the scheduler may determine accelerator devices, resources, and circuitry to enable and/or disable based on requirements. Moreover, the scheduler may determine which nodes include the accelerator devices, resources, and circuitry are available and to perform power operations. In some instances, the scheduler may determine which nodes to perform the power operations based on load balancing and/or on a service level agreement (SLA) that is associated with a workload.

In embodiments, the processing flow 400 includes the scheduler directing a management controller to perform a power operation for one or more accelerator(s) at block 404. The management controller may include a virtual management monitor (VMM) (libvirt), a BMC, a management engine using a serial management interface or out-of-band message system (OOBMSM) to perform the power operation. The power operation may include enabling and/or disabling accelerator devices and infrastructure devices. Further and at block 406, the scheduler notifies the operating system or virtual management monitor (VMM) of the power operation. At block 406, the management controller utilizing an operating system or VMM may perform one or more operations in preparation to perform the power operation. For example, when disabling accelerator devices the operating system or VMM may offload processes and workloads from the accelerator devices to be disabled. Similarly, in preparation of enabling accelerator devices, the operating systems or VMM determines workloads and processes to execute on the accelerator devices once the accelerator devices are enabled.

In embodiments, the processing flow 400 includes the operating system or VMM performing a hot-plug flow at block 408 if the input/output (I/O) link between the CPU and accelerator to perform the power operation is operating system managed or visible, e.g., the operating system can control the I/O link. Further and a block 410, the logic flow includes the operating system or VMM informing the BIOS to perform the power operation at block 410. Alternatively, if the I/O link between the CPU and accelerator is BIOS managed or not visible to the operating system, e.g., the operating system cannot control the I/O link, the operating system hands control off to the BIOS at block 412. For example, the operating system may send a message to the BIOS via an interconnect or interrupt. At block 414, the BIOS performs the hot-plug flow.

At block 416, the processing flow 400 includes the BIOS reading a CPU capability identification (CAPID) to determine the CPU and the accelerator to perform the power operation. The CAPID may be a register associated with the CPU that the BIOS reads to determine the accelerator, for example. At block 418, the BIOS may issue a power operation indication to the CPU associated with the accelerator. In embodiments, the power operation indication may be a mailbox command, such as a BIOS2Pcode mailbox command, to cause the power operation.

In embodiments, the logic 400 includes the CPU and accelerator performing the power operation, at block 420. The one or more operations performed at block 420 may be consistent with the operations discussed above with respect to flows 200 and 250 in FIGS. 2A and 2B, respectively. More specifically, if the power operation is to enable an accelerator, one or more operations discussed in processing flow 200 may be performed. If the power operation is to disable an accelerator, one or more operation discussed in processing flow 250 may be performed.

At block 422, the BIOS detects completion of the power operation. For example, the CPU may send an indication to the BIOS indicating the power operation has completed. In some instances, the BIOS may poll for the mailbox command completion. Further and a block 424, the BIOS may notify the operating system the power operation has completed for the accelerator. For example, the BIOS may set one or more registers that may be read by the operating system to determine the power operation is complete.

In embodiments, the processing flows discussed above with respect to FIGS. 2A, 2B, and 4 and systems 100 and 150 may be utilized to perform the below-illustrated example usages. For example, the above-discussed systems and flows may be utilized for resource biased workload scheduling and platform budget rebalancing to increase MCP and CPU performance. For example, a scheduler may determine the resources required for running the upcoming workloads/jobs. As indicated in the processing flow 200, 250, and 400, the scheduler may notify and send a request to a management controller and operating system. The operating system or VMM, and BIOS may translate the request and issue a mailbox command to perform a power operation. The CPU will enable or disable the accelerator devices based on the resources required. In one example, in the case of an accelerator being offline, the CPU may utilize Serial Voltage Identification (SVID) control to read the power information from the platform voltage regulators. The SVID information indicates the energy that is available for CPU to use based on the accelerator being disabled. The CPU may use this SVID information to rebalance/redistribute the energy to resources, such as cores, graphic processors, and other accelerator devices. Also, any accelerator specific motherboard voltage regulators (MBVRs) can also be turned on/off using the SVID by the CPU.

In another example, the above-discussed processing flow 200, 250, and 400, and systems 100, 150, and 300 enable accelerator configuration changes without platform warm or cold resets. For example, an accelerator device may include a configurable number of infrastructure devices, e.g., multiple graphic processing devices within a graphics accelerator and only certain number of these are needed for a workload. Previously, power management supported states such as C6 or D3 may save some power, but does not give optimized performance since the credit buffers programmed within these dies still need to account for full resource allocation. This essentially means that the accelerator forgoes some of the performance. To re-adjust this configuration, instead of letting the entire platform go through warm or cold reset cycle as done traditionally, embodiments discussed herein are used to perform a recycle, e.g., a disable and enable or re-enable, for the particular accelerator and the infrastructure is reprogrammed to achieve optimal performance.

In another example, the above-discussed processing flow 200, 250, and 400, and systems 100, 150, and 300 may be used to perform a static accelerator enabling/disabling. In this example, the CPU and MCP hardware mechanism explained above is used by the BIOS to boot the accelerator devices as a part of BIOS start up. Instead of bringing up the accelerator devices along with the CPU, the above-discussed processing flows provide a mechanism to enable the BIOS to make a boot time decision on the accelerator and whether to enable or disable the accelerator.

FIG. 5 illustrates an example of a first logic flow 500 that may be representative of some or all of the operations executed by one or more embodiments described herein. For example, the logic flow 500 may illustrate operations performed by a node, as described herein.

At block 505, the logic flow 500 may include sending a power operation initiation indication to an accelerator device via the subset of the plurality of interconnects, the power operation initiation indication to indicate a power operation to be performed on one or more infrastructure devices. More specifically and at block 510, the logic flow 500 includes receiving a response the accelerator device, the response to indicate to the processor that the accelerator is ready for the power operation.

At block 515, the logic flow 500 includes causing the power operation to be performed on the accelerator device, the power operation to enable or disable power for the one or more of the infrastructure devices. To enable power for one or more accelerator devices and/or infrastructure devices, one or more operations discussed with respect to FIG. 2A may be performed. Similarly, to disable power for one or more accelerator devices and/or infrastructure devices, one or more operations discussed with respect to FIG. 2B may be performed.

Figure 6:
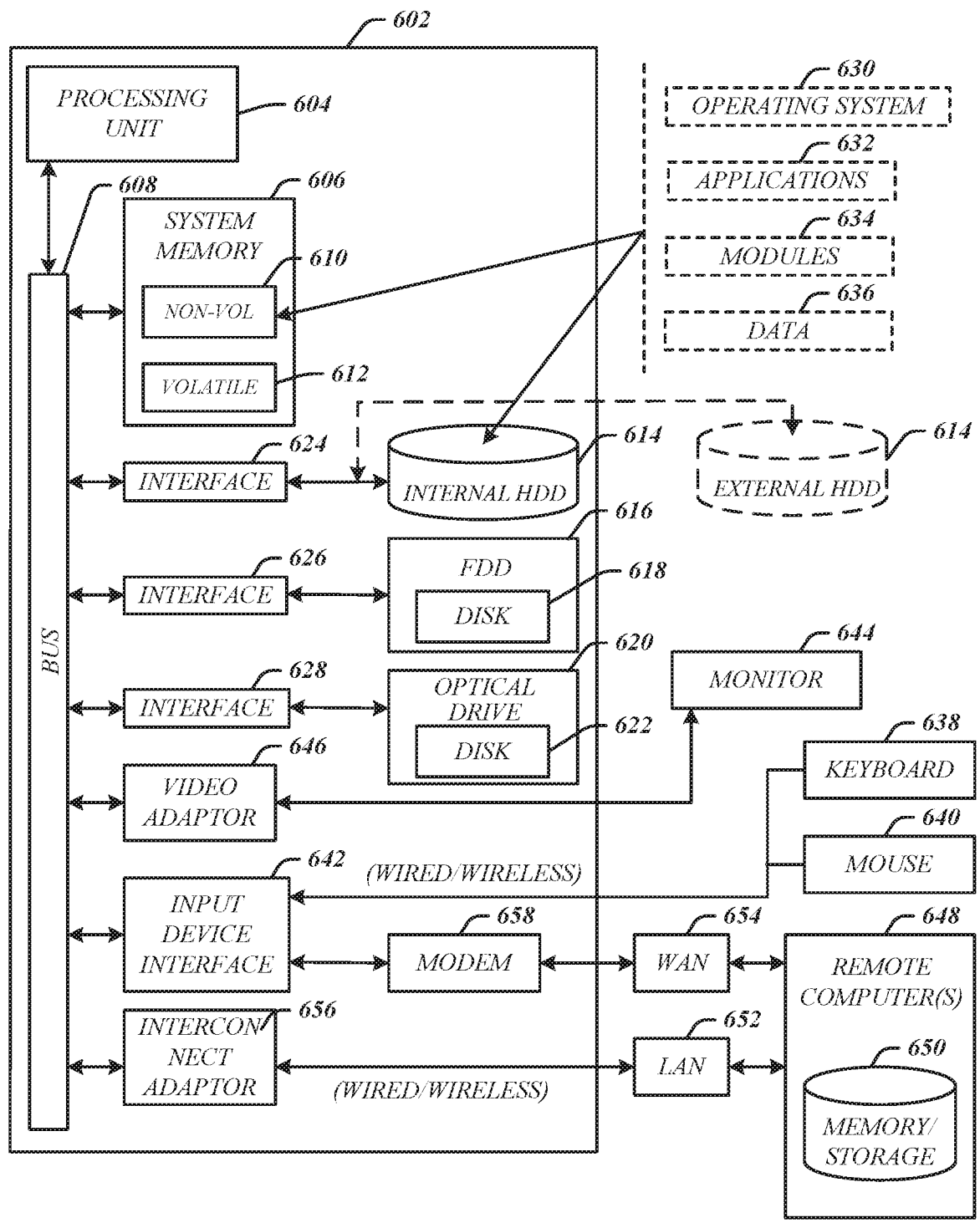
FIG. 6 illustrates an example embodiment of a computing architecture.

FIG. 6 illustrates an embodiment of an exemplary computing architecture 600 suitable for implementing various embodiments as previously described. In embodiments, the computing architecture 600 may include or be implemented as part of a node, for example.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 616, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 626, respectively. The HDD interface 624 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and components of the system 100.

A user can enter commands and information into the computer 602 through one or more wire/wireless input devices, for example, a keyboard 636 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and wireless communications to one or more remote computers, such as a remote computer 646. The remote computer 646 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and larger networks, for example, a wide area network (WAN) 654. Such LAN and WAN networking environments are commonplace in offices and companies and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 656, or is connected to a communications server on the WAN 654, or has other means for establishing communications over the WAN 654, such as by way of the Internet. The modem 656, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.11x (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three provided below are intended to be exemplary and non-limiting.

In a first example, a system, a device, an apparatus, and so forth may include processing circuitry to a multi-chip package comprising a processor and an accelerator device, the accelerator device comprising infrastructure devices, and the processor coupled with the accelerator device via a subset of a plurality of interconnects, the processor to send a power operation initiation indication to the accelerator device via the subset of the plurality of interconnects, the power operation initiation indication to indicate a power operation to be performed on one or more of the infrastructure devices, receive a response from the accelerator device, the response to indicate to the processor that the accelerator device is ready for the power operation, and cause the power operation to be performed on the accelerator device, the power operation to enable or disable power for the one or more of the infrastructure devices.

In a second example and in furtherance of the first example, a system, a device, an apparatus, and so forth to include processing circuitry to receive a power operation indication from a basic input/output system (BIOS) coupled via a second subset of the plurality of interconnects, the power operation indication to initiate the power operation for the accelerator device.

In a third example and in furtherance of any previous example, a system, a device, an apparatus, and so forth to include processing circuitry to assert a power enable pin to send the power operation initiation indication to the accelerator device to enable power for the one or more infrastructure devices, receive the response comprising a sideband ready message from the accelerator device, and send a power-on configuration message to configure one or more of the infrastructure devices.

In a fourth example and in furtherance of any previous example, a system, a device, an apparatus, and so forth to include processing circuitry to receive a sideband complete message indicating the configuration of the one or more infrastructure devices completed, de-assert a power reset pin based on the sideband complete message to cause the power operation comprising enabling power for accelerator device, and send an indication to the BIOS indicating completion of the power operation.

In a fifth example and in furtherance of any previous example, a system, a device, an apparatus, and so forth to include processing circuitry to send the power operation initiation indication comprising a sideband reset message to disable the power for the one or more infrastructure devices, receive the response comprising a sideband reset acknowledgment message, and cause the power operation via asserting the power reset pin and de-asserting the power enable pin.

In a sixth example and in furtherance of any previous example, a system, a device, an apparatus, and so forth to include processing circuitry to send an indication to the BIOS indicating completion of the power operation based on upon completion of de-asserting the power enable pin and asserting the power reset pin.

In a seventh example and in furtherance of any previous example, a system, a device, an apparatus, and so forth to include the BIOS coupled with the processor via a second subset of the plurality of interconnects, the BIOS to receive an indication to enable or disable the accelerator device from an operating system or virtual operating and send a second power operation indication to the processor based on the indication via a mailbox command communicated via the subset of the plurality of interconnects.

In an eighth example and in furtherance of any previous example, a system, a device, an apparatus, and so forth to include a management controller coupled with a scheduler, the management controller to receive an indication to enable or disable the accelerator device from the scheduler, and to cause the operating system or virtual operating system to send the indication to enable or disable the accelerator device to the BIOS.

In a ninth example and in furtherance of any previous example, a system, a device, an apparatus, and so forth to include a management controller, and a basic input/output system (BIOS), the management controller and the BIOS coupled with the MCP.

In a tenth example and in furtherance of any previous example, a computer-implemented method may include sending a power operation initiation indication to an accelerator device via a subset of a plurality of interconnects, the power operation initiation indication to indicate a power operation to be performed on one or more of infrastructure devices of the accelerator device, receiving a response from the accelerator device, the response to indicate to a processor that the accelerator device is ready for the power operation, and causing the power operation to be performed on the accelerator device, the power operation to enable or disable power for the one or more of the infrastructure devices.

In an eleventh example and in furtherance of any previous example, a computer-implemented method may include receiving a power operation indication from a basic input/output system (BIOS) coupled via a second subset of the plurality of interconnects, the power operation indication to initiate the power operation for the accelerator device.

In a twelfth example and in furtherance of any previous example, a computer-implemented method may include asserting a power enable pin to send the power operation initiation indication to the accelerator device, receiving the response comprising a sideband ready message from the accelerator device, and sending a power-on configuration message to configure one or more of the infrastructure devices.

In a thirteenth example and in furtherance of any previous example, a computer-implemented method may include receiving a sideband complete message indicating the configuration of the one or more infrastructure devices completed, de-asserting a power reset pin based on the sideband complete message to cause the power operation comprising enabling power for accelerator device, and sending an indication to the BIOS indicating completion of the power operation.

In a fourteenth example and in furtherance of any previous example, a computer-implemented method may include sending the power operation initiation indication comprising a sideband reset message, receiving the response comprising a sideband reset acknowledgment message, and causing the power operation via asserting the power reset pin and de-asserting the power enable pin.

In a fifteenth example and in furtherance of any previous example, a computer-implemented method may include sending an indication to the BIOS indicating completion of the power operation based on upon completion of de-asserting the power enable pin and asserting the power reset pin.

In a sixteenth example and in furtherance of any previous example, a computer-implemented method may include receiving, via a basic input/output system (BIOS), an indication to enable or disable the accelerator from an operating system or virtual operating system, and sending, via the BIOS, a second power operation indication to the processor based on the indication via a mailbox command.

In a seventeenth example and in furtherance of any previous example, a computer-implemented method may include receiving, via a management controller, an indication to enable or disable the accelerator from a scheduler based on a workload resource requirement, and causing the operating system or the virtual operating system to send the indication to enable or disable the accelerator device.

In an eighteenth example and in furtherance of any previous example, a non-transitory computer-readable storage medium, comprising a plurality of instructions, that when executed, enable processing circuitry to send a power operation initiation indication to an accelerator device of a multi-chip package (MCP) via a subset of a plurality of interconnects, the power operation initiation indication to indicate a power operation to be performed on one or more of infrastructure devices of the accelerator device, receive a response from the accelerator device, the response to indicate to a processor of the MCP that the accelerator device is ready for the power operation, and cause the power operation to be performed on the accelerator device, the power operation to enable or disable power for the one or more of the infrastructure devices.

In a nineteenth example and in furtherance of any previous example, a non-transitory computer-readable storage medium, comprising a plurality of instructions, that when executed, enable processing circuitry to receive a power operation indication from a basic input/output system (BIOS) coupled via a second subset of the plurality of interconnects, the power operation indication to initiate the power operation for the accelerator device.

In a twentieth example and in furtherance of any previous example, a non-transitory computer-readable storage medium, comprising a plurality of instructions, that when executed, enable processing circuitry to assert a power enable pin to send the power operation initiation indication to the accelerator device, receiving the response comprising a sideband ready message from the accelerator device, and sending a power-on configuration message to configure one or more of the infrastructure devices.

In a twenty-first example and in furtherance of any previous example, a non-transitory computer-readable storage medium, comprising a plurality of instructions, that when executed, enable processing circuitry to receive a sideband complete message indicating the configuration of the one or more infrastructure devices completed, de-assert a power reset pin based on the sideband complete message to cause the power operation comprising enabling power for accelerator device, and send an indication to the BIOS indicating completion of the power operation.

In a twenty-second example and in furtherance of any previous example, a non-transitory computer-readable storage medium, comprising a plurality of instructions, that when executed, enable processing circuitry to send the power operation initiation indication comprising a sideband reset message, receive the response comprising a sideband reset acknowledgment message, and cause the power operation via asserting the power reset pin and de-asserting the power enable pin.

In a twenty-third example and in furtherance of any previous example, a non-transitory computer-readable storage medium, comprising a plurality of instructions, that when executed, enable processing circuitry to send an indication to the BIOS indicating completion of the power operation based on upon completion of de-asserting the power enable pin and asserting the power reset pin.

In a twenty-fourth example and in furtherance of any previous example, a non-transitory computer-readable storage medium, comprising a plurality of instructions, that when executed, enable processing circuitry to receive, via a basic input/output system (BIOS), an indication to enable or disable the accelerator from an operating system or virtual operating system, and receive, via the BIOS, a second power operation indication to the processor based on the indication via a mailbox command.

In a twenty-fifth example and in furtherance of any previous example, a non-transitory computer-readable storage medium, comprising a plurality of instructions, that when executed, enable processing circuitry to receive, via a management controller, an indication to enable or disable the accelerator from a scheduler based on a workload resource requirement, and cause the operating system or the virtual operating system to send the indication to enable or disable the accelerator device.

In a twenty-sixth example and in furtherance of any previous example, a system, a device, an apparatus, and so forth to include means for sending a power operation initiation indication to an accelerator device via a subset of a plurality of interconnects, the power operation initiation indication to indicate a power operation to be performed on one or more of infrastructure devices of the accelerator device, means for receiving a response from the accelerator device, the response to indicate to a processor that the accelerator device is ready for the power operation, and means for causing the power operation to be performed on the accelerator device, the power operation to enable or disable power for the one or more of the infrastructure devices.

In a twenty-seventh example and in furtherance of any previous example, a system, a device, an apparatus, and so forth to include means for receiving a power operation indication from a basic input/output system (BIOS) coupled via a second subset of the plurality of interconnects, the power operation indication to initiate the power operation for the accelerator device.

In a twenty-eighth example and in furtherance of any previous example, a system, a device, an apparatus, and so forth to include means for asserting a power enable pin to send the power operation initiation indication to the accelerator device, means for receiving the response comprising a sideband ready message from the accelerator device; and means for sending a power-on configuration message to configure one or more of the infrastructure devices.

In a twenty-ninth example and in furtherance of any previous example, a system, a device, an apparatus, and so forth to include means for receiving a sideband complete message indicating the configuration of the one or more infrastructure devices completed, means for de-asserting a power reset pin based on the sideband complete message to cause the power operation comprising enabling power for accelerator device; and means for sending an indication to the BIOS indicating completion of the power operation.

In a thirtieth example and in furtherance of any previous example, a system, a device, an apparatus, and so forth to include means for sending the power operation initiation indication comprising a sideband reset message, means for receiving the response comprising a sideband reset acknowledgment message, and means for causing the power operation via asserting the power reset pin and de-asserting the power enable pin.

In a thirty-first example and in furtherance of any previous example, a system, a device, an apparatus, and so forth to include means for sending an indication to the BIOS indicating completion of the power operation based on upon completion of de-asserting the power enable pin and asserting the power reset pin.

In a thirty-second example and in furtherance of any previous example, a system, a device, an apparatus, and so forth to include means for receiving an indication to enable or disable the accelerator from an operating system or virtual operating system, and means for sending a second power operation indication to the processor based on the indication via a mailbox command.

In a thirty-third example and in furtherance of any previous example, a system, a device, an apparatus, and so forth to include means for receiving an indication to enable or disable the accelerator from a scheduler based on a workload resource requirement, and means for causing the operating system or the virtual operating system to send the indication to enable or disable the accelerator device.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus to dynamically control accelerator devices, comprising:
a multi-chip package (MCP) comprising a processor and an accelerator device, the accelerator device comprising infrastructure devices, and the processor coupled with the accelerator device via a subset of a plurality of interconnects, the processor to:
receive an indication to disable the accelerator device based on a resource requirement to process a workload;
send, based on the received indication, a power operation initiation indication to the accelerator device via an interconnect of the subset of the plurality of interconnects to cause the accelerator device to perform a power operation, the power operation initiation indication to comprise a reset message to disable power for one or more of the infrastructure devices;
receive a reset acknowledgment message from the accelerator device;
cause the power operation via asserting a power reset pin and de-asserting a power enable pin; and
send an indication to a basic input/output system (BIOS) indicating completion of the power operation.

2. The apparatus of claim 1, the processor to receive the indication to disable the accelerator device from the BIOS, the indication received from the BIOS to initiate the power operation for the accelerator device.

3. The apparatus of claim 1, the processor to assert the power enable pin to send another power operation initiation indication over the interconnect to the accelerator device to enable power for the one or more of the infrastructure devices, receive a response comprising a ready message from the accelerator device, and send a power-on configuration message to configure the one or more of the infrastructure devices.

4. The apparatus of claim 3, the processor to receive a complete message indicating the configuration of the one or more of the infrastructure devices completed, de-assert the power reset pin based on the complete message to cause another power operation to enable power for the one or more infrastructure devices of the accelerator device.

5. The apparatus of claim 1, the processor to send the indication to the BIOS indicating completion of the power operation upon completion of de-asserting the power enable pin and asserting the power reset pin.

6. The apparatus of claim 1, the BIOS to receive an indication to enable or disable the accelerator device from an operating system or virtual operating system and send a second power operation indication to the processor based on the indication to enable or disable the accelerator device via a mailbox command.

7. The apparatus of claim 6, comprising:
a management controller coupled with a scheduler, the management controller to receive an indication to enable or disable the accelerator device from the scheduler, and to cause the operating system or virtual operating system to send the indication to enable or disable the accelerator device to the BIOS.

8. The apparatus of claim 1, comprising:
a management controller, the management controller and the BIOS coupled with the MCP.

9. The apparatus of claim 1, the reset message to comprise a sideband reset message, the reset acknowledgment message to comprise a sideband reset acknowledgment message.

10. A computer-implemented method to dynamically control accelerator devices, comprising:
receiving, by a processor, an indication to disable an accelerator device based on a resource requirement to process a workload;
sending, by the processor based on the received indication, a power operation initiation indication to the accelerator device via a subset of a plurality of interconnects to cause the accelerator device to perform a power operation, the power operation initiation indication comprising a reset message to disable power for one or more of infrastructure devices of the accelerator device;
receiving, by the processor, a reset acknowledgment message from the accelerator device;
causing, by the processor, the power operation via asserting a power reset pin and de-asserting a power enable pin; and
sending, by the processor, an indication to a basic input/output system (BIOS) indicating completion of the power operation.

11. The computer-implemented method of claim 10, comprising receiving the indication to disable the accelerator device from the BIOS, the indication received from the BIOS to initiate the power operation for the accelerator device.

12. The computer-implemented method of claim 10, comprising performing another power operation to enable power for the one or more of the infrastructure devices comprising:
asserting the power enable pin to send another power operation initiation indication to the accelerator device;
receiving a ready message from the accelerator device; and
sending a power-on configuration message to configure the one or more of the infrastructure devices.

13. The computer-implemented method of claim 12, comprising:
receiving a sideband complete message indicating the configuration of the one or more of the infrastructure devices completed; and
de-asserting the power reset pin based on the complete message to cause the another power operation to enable power for the one or more infrastructure devices of the accelerator device.

14. The computer-implemented method of claim 10, comprising sending the indication to the BIOS indicating completion of the power operation upon completion of de-asserting the power enable pin and asserting the power reset pin.

15. The computer-implemented method of claim 10, comprising:
receiving, via the BIOS, an indication to enable or disable the accelerator from an operating system or virtual operating system; and
sending, via the BIOS, a second power operation indication to the processor based on the indication to enable or disable the accelerator device via a mailbox command.

16. The computer-implemented method of claim 15, comprising:
receiving, via a management controller, an indication to enable or disable the accelerator from a scheduler based on the requirement to process the workload; and
causing the operating system or the virtual operating system to send the indication to enable or disable the accelerator device based on whether the requirement to process the workload indicates at least a portion of the workload is to be processed by the accelerator device.

17. The method of claim 10, the reset message to comprise a sideband reset message, the reset acknowledgment message to comprise a sideband reset acknowledgment message.

18. A non-transitory computer-readable storage medium, comprising a plurality of instructions, that when executed, enable processing circuitry to:
receive, based on a resource requirement to process a workload, an indication to disable an accelerator device of a multi-chip package (MCP);
send, based on the received indication, a power operation initiation indication to the accelerator device via a subset of a plurality of interconnects to cause the accelerator device to perform a power operation, the power operation initiation indication to comprise a reset message to disable power for one or more of infrastructure devices of the accelerator device;
receive a reset acknowledgment message from the accelerator device;
cause the power operation via asserting a power reset pin and de-asserting a power enable pin; and
send an indication to a basic input/output system (BIOS) indicating completion of the power operation.

19. The computer-readable storage medium of claim 18, comprising a plurality of instructions, that when executed, enable processing circuitry to receive the indication to disable the accelerator device from the BIOS, the indication received from the BIOS to initiate the power operation for the accelerator device.

20. The computer-readable storage medium of claim 18, comprising a plurality of instructions, that when executed, enable processing circuitry to:

assert the power enable pin to send another power operation initiation indication to the accelerator device, receiving a ready message from the accelerator device; and sending a power-on configuration message to configure the one or more of the infrastructure devices.

21. The computer-readable storage medium of claim 20, comprising a plurality of instructions, that when executed, enable processing circuitry to:

receive a complete message indicating the configuration of the one or more of the infrastructure devices completed; and de-assert the power reset pin based on the complete message to cause another power operation comprising enabling power for the accelerator device.

22. The computer-readable storage medium of claim 20, comprising a plurality of instructions, that when executed, enable processing circuitry to send the indication to the BIOS indicating completion of the power operation upon completion of de-asserting the power enable pin and asserting the power reset pin.

23. The computer-readable storage medium of claim 18, comprising a plurality of instructions, that when executed, enable processing circuitry to:

receive, via the BIOS, an indication to enable or disable the accelerator from an operating system or virtual operating system; and send, via the BIOS, a second power operation indication to the processing circuitry based on the indication to enable or disable the accelerator device via a mailbox command.

24. The computer-readable storage medium of claim 23 comprising a plurality of instructions, that when executed, enable processing circuitry to:

receive, via a management controller, an indication to enable or disable the accelerator from a scheduler based on the requirement to process the workload; and cause the operating system or the virtual operating system to send the indication to enable or disable the accelerator device based on whether the requirement to process the workload indicates at least a portion of the workload is to be processed by the accelerator device.

25. The computer-readable storage medium of claim 18, the reset message to comprise a sideband reset message, the reset acknowledgment message to comprise a sideband reset acknowledgment message.

* * * * *